(12) United States Patent
Dimtrova et al.

(10) Patent No.: US 7,636,662 B2
(45) Date of Patent: Dec. 22, 2009

(54) SYSTEM AND METHOD FOR AUDIO-VISUAL CONTENT SYNTHESIS

(75) Inventors: Nevenka Dimtrova, Pelham Manor, NY (US); Andrew Miller, New York, NY (US); Dongge Li, Palatine, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 483 days.

(21) Appl. No.: 10/573,736

(22) PCT Filed: Sep. 28, 2004

(86) PCT No.: PCT/IB2004/051903

§ 371 (c)(1),
(2), (4) Date: Mar. 28, 2006

(87) PCT Pub. No.: WO2005/031654

PCT Pub. Date: Apr. 7, 2005

(65) Prior Publication Data

US 2006/0290699 A1      Dec. 28, 2006

Related U.S. Application Data

(60) Provisional application No. 60/507,098, filed on Sep. 30, 2003.

(51) Int. Cl.
*G10L 13/00* (2006.01)
(52) U.S. Cl. ............... 704/260; 704/258; 704/265; 345/473; 345/474
(58) Field of Classification Search ........... 704/258, 704/260, 265; 345/473, 474
See application file for complete search history.

(56) References Cited

U.S. PATENT DOCUMENTS

| | | | | |
|---|---|---|---|---|
| 6,052,132 A | * | 4/2000 | Christian et al. | 345/474 |
| 6,366,885 B1 | * | 4/2002 | Basu et al. | 704/270 |
| 6,449,595 B1 | * | 9/2002 | Arslan et al. | 704/235 |
| 6,539,354 B1 | * | 3/2003 | Sutton et al. | 704/260 |
| 6,661,418 B1 | * | 12/2003 | McMillan et al. | 345/473 |
| 6,735,566 B1 | * | 5/2004 | Brand | 704/256 |
| 6,772,122 B2 | * | 8/2004 | Jowitt et al. | 704/270 |

(Continued)

FOREIGN PATENT DOCUMENTS

WO     WO 02/05114 A1     1/2002

OTHER PUBLICATIONS

W.R. Rabiner et al, "Object Tracking Using Motion-Adaptive Modeling of Scene Content", Proceedings of Globecom, vol. 2, pp. 877-881, 1996.

(Continued)

*Primary Examiner*—Daniel D Abebe

(57) ABSTRACT

A system and method is provided for synthesizing audio-visual content in a video image processor. A content synthesis application processor extracts audio features and video features from audio-visual input signals that represent a speaker who is speaking. The processor uses the extracted visual features to create a computer generated animated version of the face of the speaker. The processor synchronizes facial movements of the animated version of the face of the speaker with a plurality of audio logical units such as phonemes that represent the speaker's speech. In this manner the processor synthesizes an audio-visual representation of the speaker's face that is properly synchronized with the speaker's speech.

20 Claims, 8 Drawing Sheets

U.S. PATENT DOCUMENTS

| | | | |
|---|---|---|---|
| 6,839,672 B1 * | 1/2005 | Beutnagel et al. | 704/260 |
| 7,123,262 B2 * | 10/2006 | Francini et al. | 345/473 |
| 7,149,686 B1 * | 12/2006 | Cohen et al. | 704/241 |
| 7,168,953 B1 * | 1/2007 | Poggio et al. | 434/185 |
| 2002/0008716 A1 | 1/2002 | Colburn et al. | |
| 2003/0149659 A1 * | 8/2003 | Danaher et al. | 705/38 |
| 2004/0021683 A1 * | 2/2004 | Huang et al. | 345/716 |
| 2005/0057570 A1 * | 3/2005 | Cosatto et al. | 345/473 |
| 2006/0204060 A1 * | 9/2006 | Huang et al. | 382/118 |

OTHER PUBLICATIONS

G. Hager et al, "The XVision System: A General Purpose Substrate fo Portable Real-Time Vision Applications", Computer Visionand Understanding, vol. 69, No. 1, pp. 23-37, 1997.

D. Li et al, "Classification of General Audio Data for Content-Based Retrieval", Pattern Recognition Letters, vol. 22, No. 5, pp. 533-544, 2001.

L.R. Rabiner, "A Tutorial on Hidden Markov Models and Selected Applications in Speech Recognition", Proceedings of the IEEE, vol. 77, pp. 257-285, 1989.

M. Brand, "Voice Puppetry", Computer Graphics Proceedings, ACM SIGGRAPH, pp. 21-28, Aug. 1999.

D. Li et al, "Content Retrieval Based on Semantic Association", filed Nov. 15, 2002.

S. Curinga, "Lip Movements Synthesis USing Time-Delay" Proceedings of the European Signal Processing Conference, 1996.

T. Masuko et al, "Text-to-Visual Speech Synthesis Based on parameter Generation From HMM", IEEE 1998, pp. 3745-3748.

Tsuhan Chen; "Audio-Visual Itegration in Multimodal Communication", Proceedings of the IEEE, vol. 86, No. 5, May 1998.

* cited by examiner

SYSTEM AND METHOD FOR AUDIO-VISUAL CONTENT SYNTHESIS

CROSS REFERENCE TO RELATED APPLICATION

This application claims the benefit of U.S. provisional application Ser. No. 60/507,098 filed Sep. 30, 2003, which the entire subject matter is incorporated herein by reference.

The present invention is directed, in general, to audio-visual systems and, more specifically, to a system and method for synthesizing audio-visual content in a video image processor.

Advances in computer science continue to increase the speed and computational power of computers. When computers communicate with human computer users a large portion of the communication takes place in the form of text messages in graphic displays that the human computer user reads from a computer screen. Some computer applications, especially those developed to display computer game graphics, are capable of presenting computer output to a computer user in the form of a computer generated visual image of a person who is speaking. Specifically, the computer generates an animated version of a human face to represent the speaker who is speaking and simultaneously outputs the speech of the speaker.

Realistic computer generated visual images of persons who are speaking are very difficult for a computer system to create. This is because a human face can demonstrate a wide range of facial gestures during the course of speaking. The human face can show many subtle features that express emotion and give additional meaning to the words that are being spoken. Each human being has been recognizing and interpreting facial gestures since birth. Therefore a human computer user is able to quickly detect poor quality computer generated animated human faces. A poor quality animated human face can often be distracting to the human computer user. At worst, a poor quality animated human face can even interfere with the comprehension of the message that the animated human face is speaking.

There is therefore a need in the art for a system and method that is capable of creating a realistic audio-visual representation of a speaker who is speaking. There is also a need in the art for a system and method that is capable of creating realistic facial gestures for a computer generated animated human face.

To address the deficiencies of the prior art mentioned above, the system and method of the present invention is capable of providing a realistic audio-visual representation of a speaker who is speaking. The system and method of the present invention is also capable of creating realistic facial gestures for a computer generated animated human face.

The system and method of the present invention comprises a content synthesis application processor that is located in a computer system of a video image processor. The content synthesis application processor extracts audio features and video features from audio-visual input signals that represent a speaker who is speaking. The processor uses the extracted visual features to create a computer generated animated version of the face of the speaker. The processor classifies visual face movement components of the speaker's facial features by using either a Hidden Markov Model or a Time Delayed Neural Network to represent a speaking face movement component.

The content synthesis application processor comprises a learning module that extracts and classifies both audio features and video features of the speaker's speech. The processor classifies the extracted audio features of the speaker's speech by using either a Hidden Markov Model or a Time Delayed Neural Network to represent audio logical units such as phonemes. The processor then synchronizes the facial movements of the animated version of the face of the speaker with a plurality of the audio logical units that represent the speaker's speech. In this manner the processor synthesizes a realistic audio-visual representation of the speaker's face that is properly synchronized with the speaker's speech.

In one advantageous embodiment of the invention, in a training phase the processor creates audiovisual input vectors from the audio features and the video features of the speaker's face. The processor then creates audiovisual speaking face movement components from the audiovisual input vectors by using either a Hidden Markov Model or a Time Delayed Neural Network. The processor then performs a semantic association procedure on the audiovisual input vectors to obtain an association between phonemes that represent the speaker's face and visemes that represent the speaker's face.

In a recognition phase the processor analyzes a new input video. The processor extracts audio features of the speaker's speech and finds corresponding video representations for the audio features using a semantic association procedure. The processor then matches the corresponding video representations with the audiovisual speaking face movement components by using either a Hidden Markov Model or a Time Delayed Neural Network. The processor then creates a computer generated animated face for each selected audiovisual speaking face movement component and synchronizes each computer generated animated face with the speaker's speech. The final result is an output that provides an audio-visual representation of the speaker's face synchronized with the speaker's speech.

It is an object of the present invention to provide a system and method for creating and displaying multimedia information that relates to a human face.

It is another object of the present invention to provide a system and method for creating and displaying a realistic audio-visual representation of a speaker who is speaking.

It is also an object of the present invention to provide a system and method for creating and displaying realistic facial gestures for a computer generated animated human face.

It is another object of the present invention to provide a system and method for synchronizing the facial movements of an animated version of the face of a speaker with a plurality of the audio logical units that represent the speaker's speech.

It is also an object of the present invention to provide a system and method for synthesizing audio-visual content in a video image processor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most instances, such definitions apply to prior uses, as well as future uses, of such defined words and phrases.

For a more complete understanding of the present invention, and the advantages thereof, reference is now made to the following descriptions taken in conjunction with the accompanying drawings, wherein like numbers designate like objects, and in which.

FIGS. 1 through 8, discussed below, and the various embodiments used to describe the principles of the present invention in this patent document are by way of illustration only and should not be construed in any way to limit the scope of the invention. The present invention may be used in any suitable audio-visual system.

Figure 1:
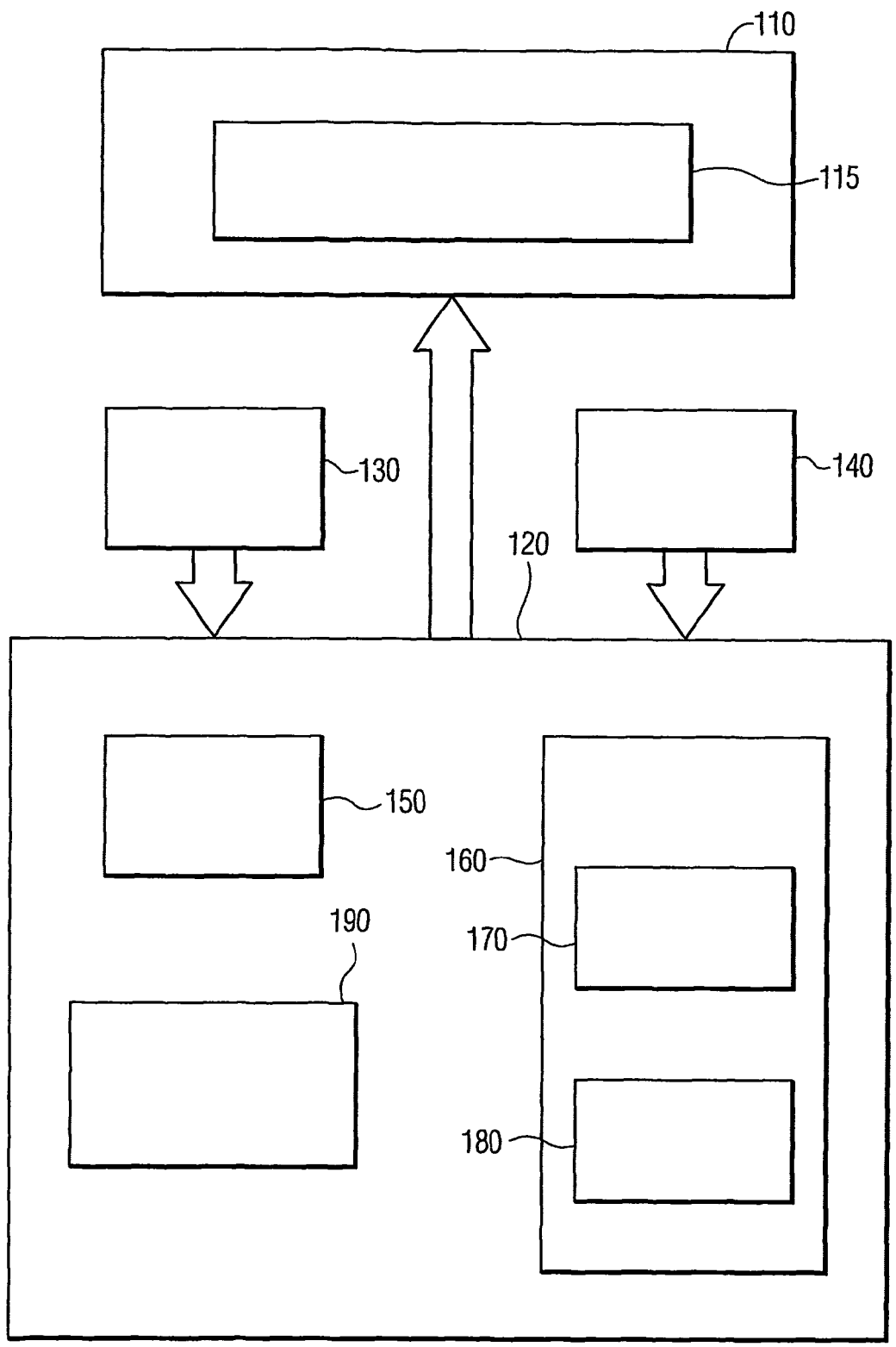
FIG. 1 is a block diagram illustrating a display unit and an exemplary computer comprising a content synthesis application processor in accordance with the principles of the present invention.

FIG. 1 is a block diagram illustrating display unit 110 (having a display screen 115) and an exemplary computer 120 that comprises a content synthesis application processor 190 in accordance with the principles of the present invention. Computer 120 receives audio-visual signals from a source 130 of audio-visual signals. Source 130 may provide previously recorded audio-visual signals to computer 120. Source 130 may also provide live or "streaming" audio-visual signals to computer 120. Computer 120 also receives user input signals from user input unit 140. User input unit 140 may comprise any conventional source of user input signals (e.g., keyboard, mouse, computer disk files).

Computer 120 comprises a central processing unit (CPU) 150 and memory 160. Memory 160 comprises operating system software 170 and application programs 180. Computer 120 also comprises content synthesis application processor 190 of the present invention. For convenience in description, the structure and operation of content synthesis application processor 190 will be described as a unit that is separate from CPU 150 and memory 160. It is understood, however, that content synthesis application processor 190 may access and utilize the facilities of CPU 150 and memory 160 within computer 120 in order to carry out the method of the present invention.

As will be more fully described, content synthesis application processor 190 analyzes audio-visual input signals from source 130 that represent a speaker who is speaking. Content synthesis application processor 190 extracts audio features and visual features from the audio-visual input signals from source 130 and uses the audio features and visual features to create a computer generated animated version of the face of the speaker and synchronizes the animated version of the face of the speaker with the speaker's speech. The computer generated animated version of the face of the speaker (with synchronized speech) may be displayed on display screen 115 of the display unit 110. Display unit 110 may comprise any conventional type of display unit (e.g., television, computer monitor, flat panel display screen).

Figure 2:
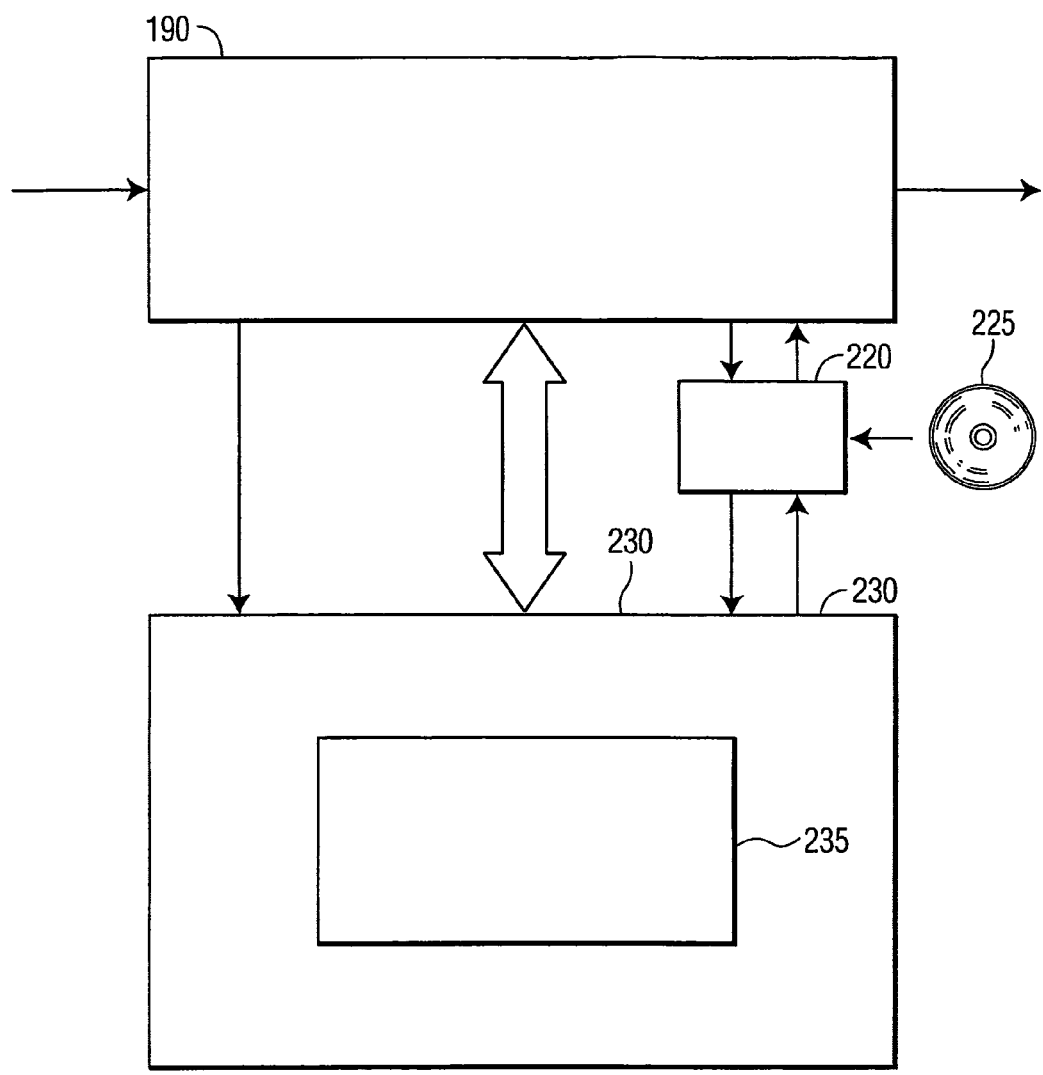
FIG. 2 is a block diagram illustrating the content synthesis application processor of the present invention in more detail.

FIG. 2 a block diagram illustrating content synthesis application processor 190 of the present invention in more detail. Content synthesis application processor 190 is capable of storing audio-visual signals (and various components thereof) in memory unit 220. Memory unit 220 may comprise random access memory (RAM). Memory unit 220 may comprise a non-volatile random access memory (RAM), such as flash memory. Memory unit 220 may comprise a mass storage data device, such as a hard disk drive (not shown). Memory unit 220 may also comprise an attached peripheral drive or removable disk drive (whether embedded or attached) that reads read/write DVDs or re-writable CD-ROMs. As illustrated in FIG. 2, removable disk drives of this type are capable of receiving and reading re-writable CD-ROM disk 225.

Content synthesis application processor 190 provides the audio-visual signals to controller 230. Controller 230 is also capable of receiving control signals from content synthesis application processor 190 and sending control signals to content synthesis application processor 190. Controller 230 is also coupled to content synthesis application processor 190 through memory unit 220.

Figure 3:
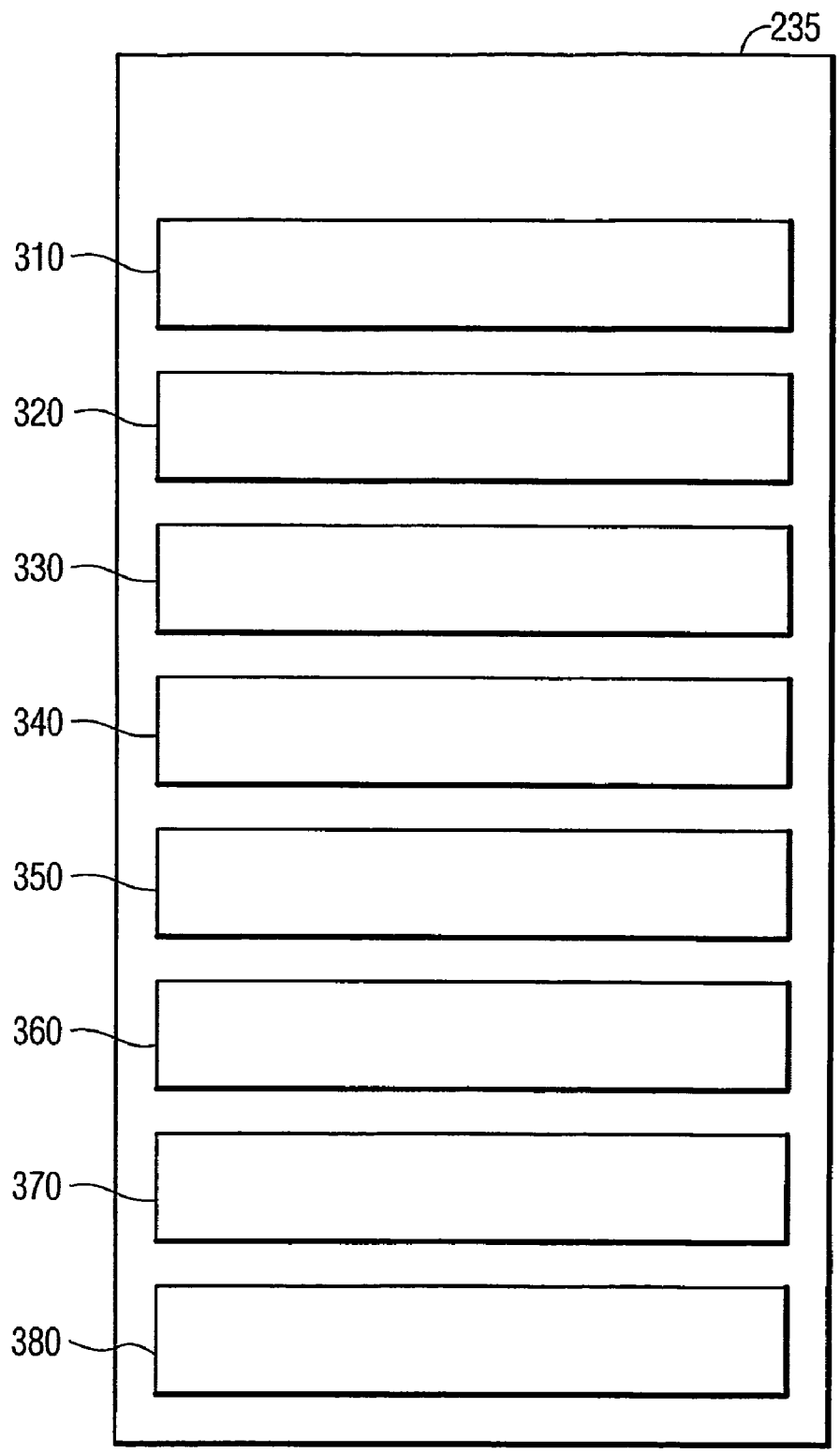
FIG. 3 is a block diagram illustrating some software modules of the present invention.

As shown in FIG. 2, controller 230 comprises content synthesis application software 235. Content synthesis application software 235 comprises computer software that is capable of carrying out the method of the present invention. Some of the software modules of the present invention are shown in FIG. 3.

Content synthesis application software 235 comprises (1) a module 310 for obtaining the visual display of a face, (2) a module 320 for tracking facial features, (3) a learning module 330, (4) a module 340 for obtaining a speech portion of audio, (5) a module 350 for extracting audio features of speech, (6) a facial audio visual feature matching and classification module 360, (7) a facial animation for selected parameters module 370, and (8) a speaking face animation and synchronization module 380. The functions of the software modules will be described more fully below.

Content synthesis application processor 190 comprises controller 230 and content synthesis application software 235. Controller 230 and content synthesis application software 235 together comprise a content synthesis application processor that is capable of carrying out the present invention.

As previously mentioned, content synthesis application processor 190 extracts audio features and visual features from audio-visual input signals and uses the audio features and visual features to create a computer generated animated face for the speaker. Content synthesis application processor 190 also synchronizes the computer generated animated face of the speaker with the speaker's speech. To accomplish this result, content synthesis application processor 190 first obtains the audio features and the visual features from the audio-visual signals.

Figure 4:
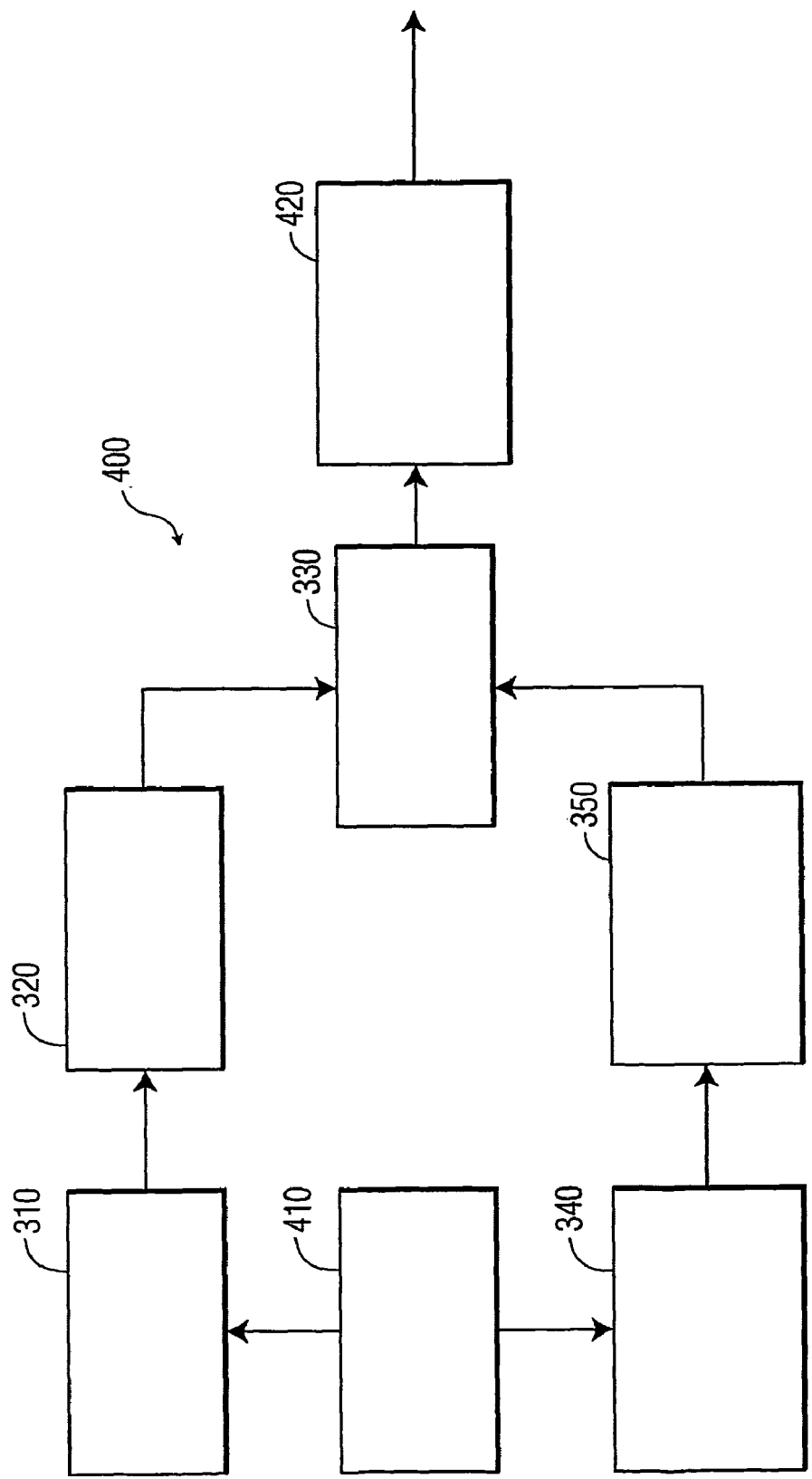
FIG. 4 is a block diagram illustrating how the content synthesis application processor of the present invention obtains speaking face movement components (SFMC)

FIG. 4 illustrates how content synthesis application processor 190 obtains speaking face movement components (SFMC) from the audio-visual signals. The elements shown in FIG. 4 are collectively referred to with reference numeral 400. The input audio-visual signals in FIG. 4 are represented by source 410. Source 410 provides the audio-visual signals to module 310. Module 310 obtains a visual display of the face of a speaker from the audio-visual signals. Module 310 may comprise a system of the type described by W. R. Rabiner and A. Jacquin in a paper entitled "Object Tracking Using Motion-Adaptive Modeling of Scene Content," Proceedings of Globecom '96, Volume 2, pp. 877-881 (November 1996). Module 310 then provides the visual display of the face of the speaker to module 320.

Module 320 tracks the facial features of the face of the speaker. Module 320 may comprise an XVision software system of the type described by G. Hager and K. Toyama in a paper entitled "The XVision System: A General Purpose Substrate for Portable Real-Time Vision Applications," Computer Vision and Understanding, Volume 69(1), pp. 23-37 (1997). The XVision system provides a number of different feature-based and correlation-based trackers that are capable of following edges, corners, or regions within a video stream. Module 320 provides the tracking information for the facial features of the speaker to learning module 330.

Source 410 of audio-visual signals also provides audio-visual signals to module 340. Module 340 obtains the speech portion of the audio signal for the speaker whose face is identified by module 310. Module 340 may comprise a system of the type described by Dongge Li, Ishwar K. Seti, Nevenka Dimitrova and Thomas McGee in a paper entitled "Classification of General Audio Data for Content-Based Retrieval," Pattern Recognition Letters, Volume 22(5), pp. 533-544 (2001). Module 340 then provides the speech of the speaker to module 350. Module 350 extracts the audio features of the speaker's speech. Module 350 may also comprise a system of the type described in the above referenced paper "Classification of General Audio Data for Content-Based Retrieval." Module 350 then provides the extracted audio features of the speaker's speech to learning module 330. As will be more fully described, learning module 330 classifies the input from module 320 and the input from module 350 to obtain speaking face movement components (SFMC) 420. The speaking face movement components (SFMC) 420 are stored in database 505 (shown in FIG. 5).

Learning module 330 comprises a software module that is capable of performing several different types of processes. One type of process performed by learning module 330 uses Hidden Markov Models for training using a Baum-Welch algorithm. Another type of process performed by learning module 330 uses Hidden Markov Models for recognition using a Viterbi algorithm. Learning module 330 can also use Time Delay Neural Networks (TDNN) as an alternative to Hidden Markov Models. Learning module 330 is also capable of performing a process that executes semantic association computations.

In one advantageous embodiment of the invention, learning module 330 classifies the facial features of the face of the speaker (input from module 320) and the extracted audio features of the speaker's speech (input from module 350) using a Hidden Markov Model (HMM). The values of the data from module 320 and from module 350 are used as components of an n-dimensional feature vector f=f ($f_1$, $f_2$, $f_3$, . . . , $f_n$). The feature vector is recorded for a time segment. Then the observation symbols are fed into a Hidden Markov Model (HMM).

A Hidden Markov Model (HMM) is a common technique widely used in signal processing. A Hidden Markov Model (HMM) constructs a model that explains the occurrence of observations (symbols) and uses the model to identify other observation sequences. For background information concerning the Hidden Markov Model (HMM) and its applications, consult a paper by L. R. Rabiner entitled "A Tutorial on Hidden Markov Models and Selected Applications in Speech Recognition," Proceedings of the IEEE, Volume 77, Pages 257-285 (1989).

In a HMM there are a finite number of states available and the HMM is always in one of those states. At each clock time, the HMM enters a new state based on a transition probability distribution that depends upon the previous state. After a transition is made, an output symbol the HMM generates an output symbol based on a probability distribution that depends upon the current state. In the formal definition of HMM the states are denoted as Q={$q_1$, $q_2$, $q_3$, . . . , $q_N$}, where N is the number of states. The observation symbols are denoted as V={$v_1$, $v_2$, $v_3$, . . . , $V_M$}, where M is the number of symbols. The transition probability distribution between states is represented by a matrix A={$a_{ij}$}, where $a_{ij}$=Pr{$q_j$ at t+1 |$q_i$ at t}, and the observation symbol probability distribution is represented by a matrix B={$b_j(k)$}, where $b_j(k)$ is the probability of generating $v_k$ when the current state is $q_j$.

The operation of the HMM in learning module 330 proceeds in two phases. The first phase is a training phase and the second phase is a classification phase. The training phase will be described first. The learning module 330 constructs a plurality of different HMMs where each HMM corresponds to a different logical unit. A logical unit may be a word, or a phoneme, or a viseme. In one advantageous embodiment of the invention, the logical unit is a phoneme. A phoneme is a unit of sound in spoken language by which utterances are represented. Each spoken language has a different set of phonemes. According to Longman's Dictionary of American English, there are forty six (46) phonemes in American English. The number of phonemes in American English is the subject of some debate. Some believe there are forty (40), forty three (43), forty eight (48), or fifty (50) such phonemes.

In another advantageous embodiment of the invention, the logical unit is a viseme. A viseme is a generic facial image that can be used to describe a particular sound. As a person pronounces each individually distinctive sound the mouth forms the speaker's lips in a distinctive way. The facial image that corresponds to the sound is called a viseme. A viseme is a visual equivalent of a phoneme. Those persons who are hearing impaired may view the sounds visually by looking at the visemes. This is how hearing impaired persons "lip-read" a speaker's face to determine what is being spoken.

Learning module 330 constructs a plurality of different HMMs through training with a collection of feature vector values. The HMM training essentially comprises adjusting parameters of lambda (λ) where λ=(A, B, π) in order to maximize the probability of the observation sequences Pr (O|λ). The symbol π represents the initial state distribution and is defined as π={$π_i$}, where $π_i$ is the probability of state $q_i$ being the initial state of the HMM. The letter O represents the observation sequence.

Learning module 330 collects a set of data that has been obtained by recording the front view of a talking person. A predefined number of sentences (e.g., two hundred sentences) are selected from the text corpus of a speech database. Both the audio signals and the video signals are digitized at thirty frames per second (30 fps) and analyzed. This creates audiovisual training data samples. Half of the data samples are used for training. Half of the data samples are used for classification (i.e., testing).

First consider the audio data samples. For each speech segment, a selection of different audio coefficients are calculated as the audio features. There are a number of acoustical features that may be used for classification. They include: MFCC (Mel Cepstral Frequency Coefficients), LPC (Linear Predictive Coding Coefficients), Delta MFCC, Delta LPC, Autocorrelation MFCC, several temporal features, and several spectral features. The MFCC features may be extracted using the Discrete Cosine Transform (DCT) of filter-banked Fast Fourier Transform (FFT) spectra. See, for example, a paper by A. M. Noll entitled "Cepstrum Pitch Determination" in The Journal of the Acoustical Society of America, Volume 41, No. 2, pp. 293-309 (1967). The calculations for the MFCC are performed frame by frame on windowed input data along the time axis. The types of windows that may be used include the Square window and the Hamming window.

The LPC features may be extracted using an autocorrelation method. See, for example, a paper by R. P. Ramachandrian et al. entitled "A Comparative Study of Robust Linear Predictive Analysis Methods with Applications to Speaker Identification" in IEEE Transactions on Speech and Audio Processing, Volume 3, No. 2, pp. 117-125 (March 1995).

The Delta MFCC features may be extracted using the MFCC features using the following relationship:

$$\Delta MFCC_i(v) = MFCC_{i+1}(v) - MFCC_i(v) \quad (1)$$

The value of Delta MFCC is the difference between adjacent values of MFCC.

The Delta LPC features may be extracted using the LPC features using the following relationship:

$$\Delta LPC_i(v) = LPC_{i+1}(v) - LPC_i(v) \quad (2)$$

The value of Delta LPC is the difference between adjacent values of LPC.

The Autocorrelation MFCC features may be extracted using the MFCC features using the following relationship:

$$ACMFCC_i^{(l)}(v) = \frac{1}{L}\sum_{j=i}^{i+L}(MFCC_j(v) \cdot MFCC_{j+l}(v)) \quad (3)$$

where the value L represents a length of a window and the index i represents a time instance and the index j represents another time instance.

Now consider the visual data samples. Content synthesis application processor 190 uses a facial motion tracking algorithm to analyze the visual face movement components. The visual face movement components correspond to facial distortions (i.e., transformations from the static model) at a certain level of granularity (e.g., word, sound). The outputs are the trained HMMs that correspond to specific speaking face movement component (SFMC) parameters. This data set is used for training for audio to visual mapping. The goal of the training procedure is to find the models λ for all of the HMMs. The graphics driven facial animation system and method of the present invention provides an effective solution to the problem of delivering and displaying multimedia information that relates to a human face.

In another advantageous embodiment of the invention, the logical unit is an audiovisual input vector. During the training process, the learning module 330 concatenates audio features and video features to create an audiovisual input vector. An audiovisual input vector is a hybrid logical unit in that an audiovisual input vector is a logical unit that exhibits properties for both the phonemes and the visemes that correspond to a particular audiovisual speaking face movement component that represents a spoken phoneme. The outputs are the trained HMMs that correspond to specific speaking face movement component (SFMC) parameters.

Consider a prior art system such as that described in a paper by Matthew Brand entitled "Voice Puppetry" published in Computer Graphics Proceedings, ACM SIGGRAPH, pp. 21-28 (August 1999). In the Voice Puppetry system the relevant speaking face movement components are only in the visual space. In contrast, in the present invention the relevant speaking face movement components are in an audiovisual space. The advantage of using speaking face movement components in audiovisual space is that it provides a more comprehensive and correct analysis. For example, in a visual space the syllable "pa" and the syllable "ba" look the same. But the pronunciation of the syllables is different. In the audiovisual space of the present invention, the audiovisual input vector of the "pa" syllable and the audiovisual input vector of the "ba" syllable are clearly distinguished.

Learning module 330 also provides a semantic association (also referred to as a cross modal association) in order to identify the mapping between a phoneme and a viseme for an each audiovisual input vector. In cross modal association, low-level features extracted from different media sources (e.g., audio and images) can be matched against each other based on synchronized correlation patterns. In addition, cross modal association may be employed to use a query from a first type of media source (e.g., audio) to search for content on a different type of media source (e.g., image sequences). See, for example, U.S. patent application Ser. No. by D. Li and N. Dimitrova entitled "Content Retrieval Based on Semantic Association" filed on Nov. 15, 2002. The patent application entitled "Content Retrieval Based on Semantic Association" is owned by the assignee of the present invention and is hereby incorporated herein by reference for all purposes.

The cross modal technique employed by learning module 330 is much more efficient than prior art techniques such as that utilized in the Voice Puppetry system previously mentioned. The Voice Puppetry system requires a very involved and expensive method to associate audio and visual patterns. The cross modal search employed by learning module 330 is based directly on low level features in a manner that is similar to traditional content-based multimedia retrieval systems. The cross modal search employed by learning module 330 may utilize either (1) latent semantic indexing, (2) canonical correlation, or (3) cross modal factor analysis.

Latent semantic indexing (LSI) is a powerful tool in text information retrieval that is used to discover underlying semantic relationship between different textual units (e.g., keywords and paragraphs). A method to detect the semantic correlation between visual faces and associated speech may be based on LSI. This method consists of four steps: the construction of a joint multimodal feature space, normalization, singular value decomposition (SVD), and semantic association measurement.

Given n visual features and m audio features at each of t video frames, the joint feature space can be expressed as:

$$X=[V_1,V_2,\ldots,V_n,A_1,A_2,\ldots,A_m] \quad (1)$$

where $$V_1=(v_1(1),v_1(2),\ldots,v_1(t))^T \quad (2)$$

and $$A_1=(a_1(1),a_1(2),\ldots,a_1(t))^T \quad (3)$$

Various visual and audio features can have quite different variations. Normalization of each feature in the joint space according to its maximum elements (or certain other statistical measurements) is thus needed and can be expressed as:

$$\hat{X}_i(:) = \frac{X_i(:)}{\max(abs(X_i(:)))} \quad (4)$$

After normalization all elements in normalized matrix x have values between −1 and 1. SVD can then be performed as follows:

$$\hat{X}=S \cdot V \cdot D^T \quad (5)$$

where S and D are matrices composing of left and right singular vectors and V is the diagonal matrix of singular values in descending order.

Keeping only the first and most important k singular vectors in S and D, we can derive an optimal approximation of $\hat{x}$ with reduced feature dimensions, where semantic (correlation) information between visual and audio features is mostly preserved and irrelevant noise is greatly reduced. Traditional Pearson correlation or mutual information calculation can then be used to effectively identify and measure semantic associations between different modalities. Experiments have shown the effectiveness of LSI and its advantages over the direct use of traditional correlation calculation.

The above optimization of $\hat{x}$ in the least square sense can be expressed as:

$$\hat{X} \cong \tilde{X} = \tilde{S} \cdot \tilde{V} \cdot \tilde{D}^T \quad (6)$$

where $\tilde{S}$, $\tilde{V}$, and $\tilde{D}$ consist of the first k vectors in S, V, and D, respectively. The selection of an appropriate value for k is still an open issue in the literature. In general, k has to be large enough to keep most of the semantic structures and small enough to remove some irrelevant noise. Equation (6) is not applicable for applications using global or off-line training since the decomposition have to be performed on the fly. However, due to the orthogonal property of singular vectors, we can rewrite (6) in a new form as follows:

$$\hat{X} \cong \tilde{X} = X \cdot \tilde{D} \cdot \tilde{D}^T \quad (7)$$

This derived new form (7) is important for those applications that need global or off-line trained SVD results.

Analysis of new incoming audio may be performed by a semantic association method to find the matching video and the most likely facial movements. In all three methods of semantic association, the transformation matrices are used to transform the low level features into a reduced feature space, where the matching between query and search candidates of different types of media sources can be evaluated. For example, for latent semantic indexing, we will use transformation matrices derived from Equation (7) above. The evaluation of matching can then be performed based on Pearson correlation or mutual information in the transformed space to find the highest correlation (i.e., the best match).

In another advantageous embodiment of the invention, learning module 330 classifies the facial features of the face of the speaker (input from module 320) and the extracted audio features of the speaker's speech (input from module 350) using a Time Delayed Neural Network (TDNN). For background information concerning the general architecture of Time Delayed Neural Networks (TDNNs), consult a paper by S. Curinga et al. entitled "Lip Movements Synthesis Using Time-Delay," in Proceedings of the European Signal Processing Conference, 1996 (1996).

TDNNs provide an estimation of the articulatory parameters without phoneme recognition and can suitably model the co-articulatory effects. The activations of the neurons in a TDNN is computed for each neuron by calculation of the weighted sum of the input window for each position of the window and by applying a sigmoid activation function to the sum. Each group of input nodes (called the receptive fields with shared weights) takes only a small window of the input symbol stream, which "marches" through the windows one step further in each time-step. The output of the hidden layer is also covered with receptive windows using shared weights. The network output consists of the sum of the squares of the different time-steps of the output neurons.

The input to a TDNN for a training process consists of a series of input symbols just as in the case of a HMM. The classification process carried out by a TDNN is similar to that carried by a HMM. Learning module 330 is also able to use a TDNN to classify the facial features of the face of the speaker (input from module 320) and the extracted audio features of the speaker's speech (input from module 350) to create an audiovisual input vectors of the type previously described.

Figure 5:
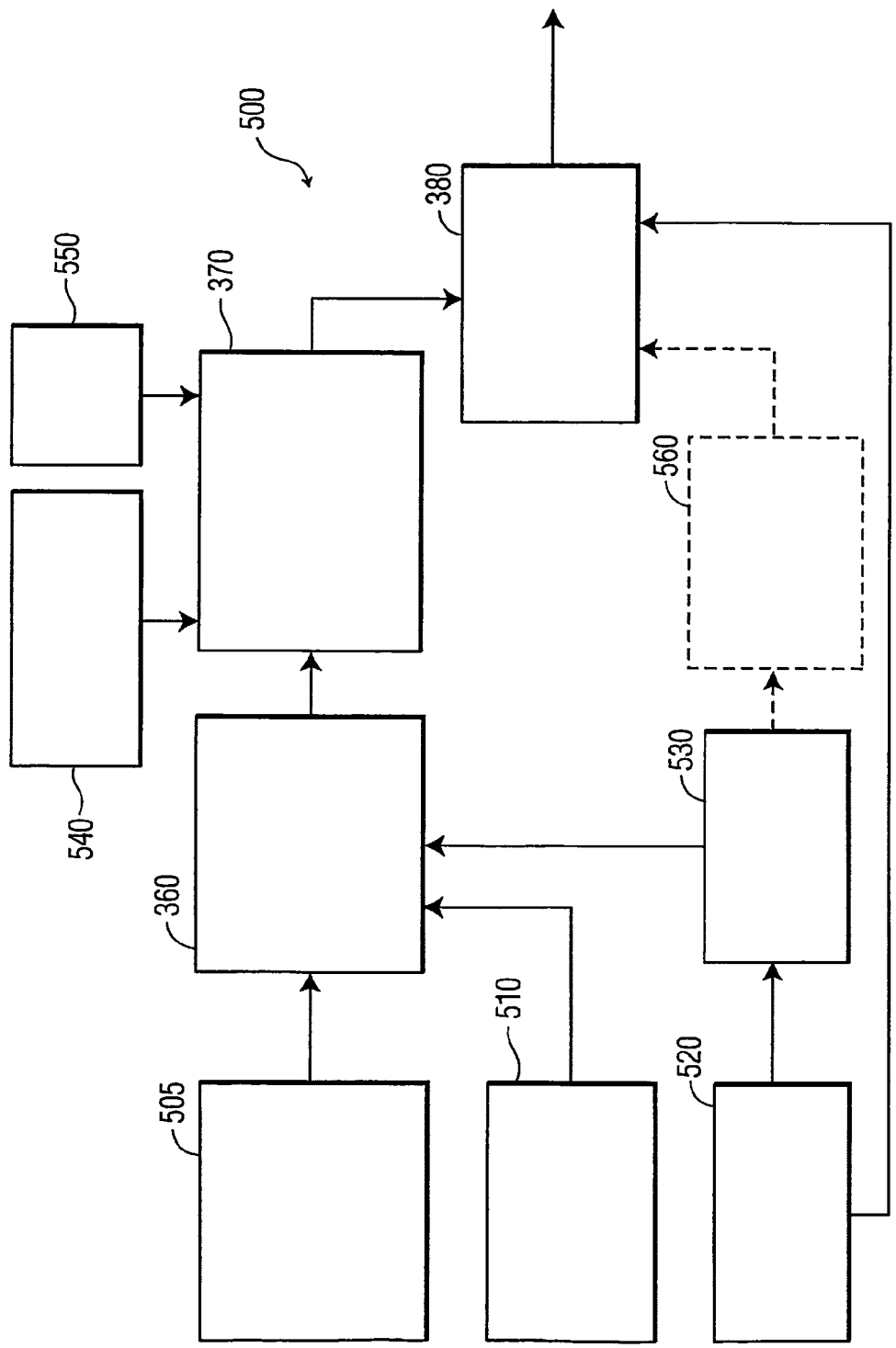
FIG. 5 is a block diagram illustrating how the content synthesis application processor of the present invention uses speaking face movement components (SFMC) and other parameters to synthesize and synchronize a speaking face animation with a speaker's speech.

FIG. 5 illustrates how content synthesis application processor 190 uses speaking face movement components (SFMC) and other parameters to synthesize and synchronize a speaking face animation with a speaker's speech. The elements shown in FIG. 5 are collectively referred to as facial animation unit 500. In any application that involves the transmission of signals through a communications channel to a remote location, facial animation unit 500 may be located at the receiver end of the communication channel. The classification process is performed at the sender end of the communication channel. The facial animation and synchronization process is performed at the receiver end of the communication channel.

Facial audio-visual feature matching and classification module 360 of facial animation unit 500 is coupled to and receives input from database 505. Database 505 contains the speaking face movement components (SFMC). Facial audio-visual feature matching and classification module 360 also receives speaking face visual parameters from speaking face visual parameters module 510. Speech module 520 provides the audio for the speaker's spoken words to audio feature extraction module 530. Audio feature extraction module 530 extracts the audio features from the speech and provides them to facial audio-visual matching and classification module 360.

During the classification process the same audio-visual symbols are extracted from the audio-visual signals in the same manner as that previously described for the training process. Facial audio-visual feature matching and classification module 360 performs the classification process to classify the audio-visual features into one of the predefined classes previously described for the training process. The granularity for the classification process (e.g., words, phonemes) is the same level of granularity as the training process.

Facial audio-visual feature matching and classification module 360 then sends the classification information to the facial animation for selected parameters module 370. Facial animation for selected parameters module 370 receives additional input from a three dimensional (3D) facial model module 540 and a texture maps module 550. Facial animation for selected parameters module 370 synthesizes the speaker's face (i.e., creates a computer generated animated version of the speaker's face) using facial animation parameters that correspond to the appropriate classification.

Most prior art systems are phoneme-based and viseme-based lip-sync systems. Such systems address the problem of synthesizing a speaker's face by interpolating or splining between poses. In contrast, the present invention uses semantic (cross modal) association to find not only individual viseme sequences but also sequences of individual viseme sequences.

The output of facial animation for selected parameters module 370 is then sent to speaking face animation and synchronization module 380. Speaking face animation and synchronization module 380 also receives input from speech module 520. Speaking face animation and synchronization module 380 synchronizes the facial animation information with the speech input from speech module 520 to create and output an animated image of the speaker's face that is synchronized with the speaker's speech.

An optional audio expression classification module 560 may be coupled between audio feature extraction module 530 and speaking face animation and synchronization module 380. Audio expression classification module 560 is capable of determining a level of audio expression (e.g., loud voice, excited voice, normal voice, soft voice) and classifying the audio in accordance with the determination. Depending upon the audio expression classification, speaking face animation and synchronization module 380 can modify the animated facial parameters to accentuate certain features to more correctly express the facial animation of the speaker's face.

Figure 6:
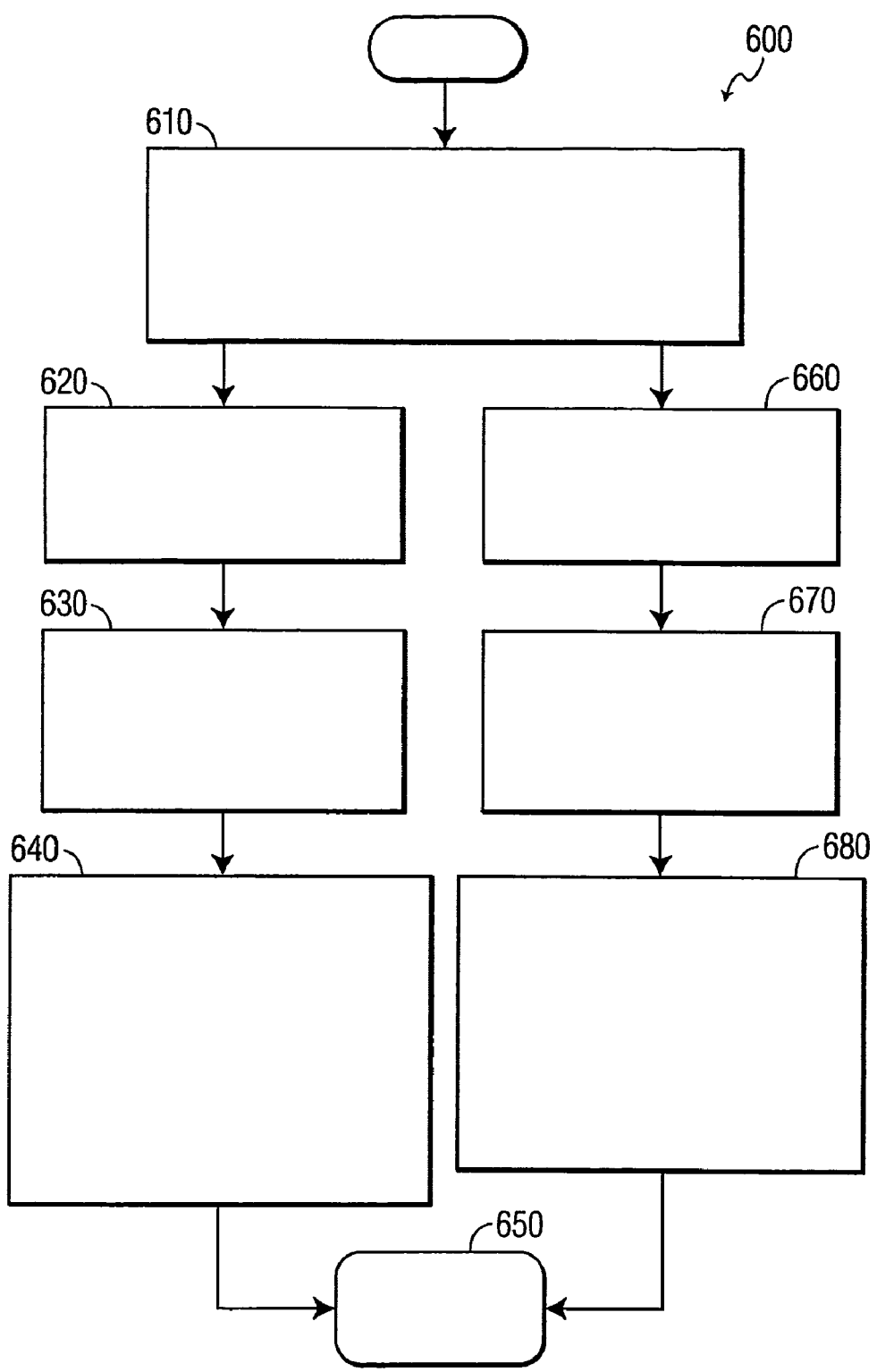
FIG. 6 illustrates a flowchart showing the steps of a first portion of an advantageous embodiment of the method of the invention.

FIG. 6 illustrates a flowchart showing the steps of a first portion of an advantageous embodiment of the method of the invention. The steps of the method shown in FIG. 6 are collectively referred to with reference numeral 600. In the first step, content synthesis application processor 190 receives audio-visual signals of a speaker who is speaking (step 610). Content synthesis application processor 190 analyzes the audio-visual signals to obtain a visual display of the speaker's face (step 620). Content synthesis application processor 190 then obtains tracking information for the speaker's spatial features (step 630). Learning module 330 then classifies visual face movement components using a Hidden Markov Model to represent each speaking face movement component (SFMC) (step 640). The method of the invention then continues on to step 710 shown in FIG. 7 (step 650).

Simultaneously with he operation described in step 620, content synthesis application processor 190 obtains the portion of the audio that contains the speaker's speech (step 660). Content synthesis application processor 190 then extracts the audio features of the speaker's speech (step 670). Learning module 330 then classifies the audio features using a Hidden Markov Model to represent each audio logical unit (e.g., phoneme) (step 680). The method of the invention then continues on to step 710 shown in FIG. 7 (step 650).

Figure 7:
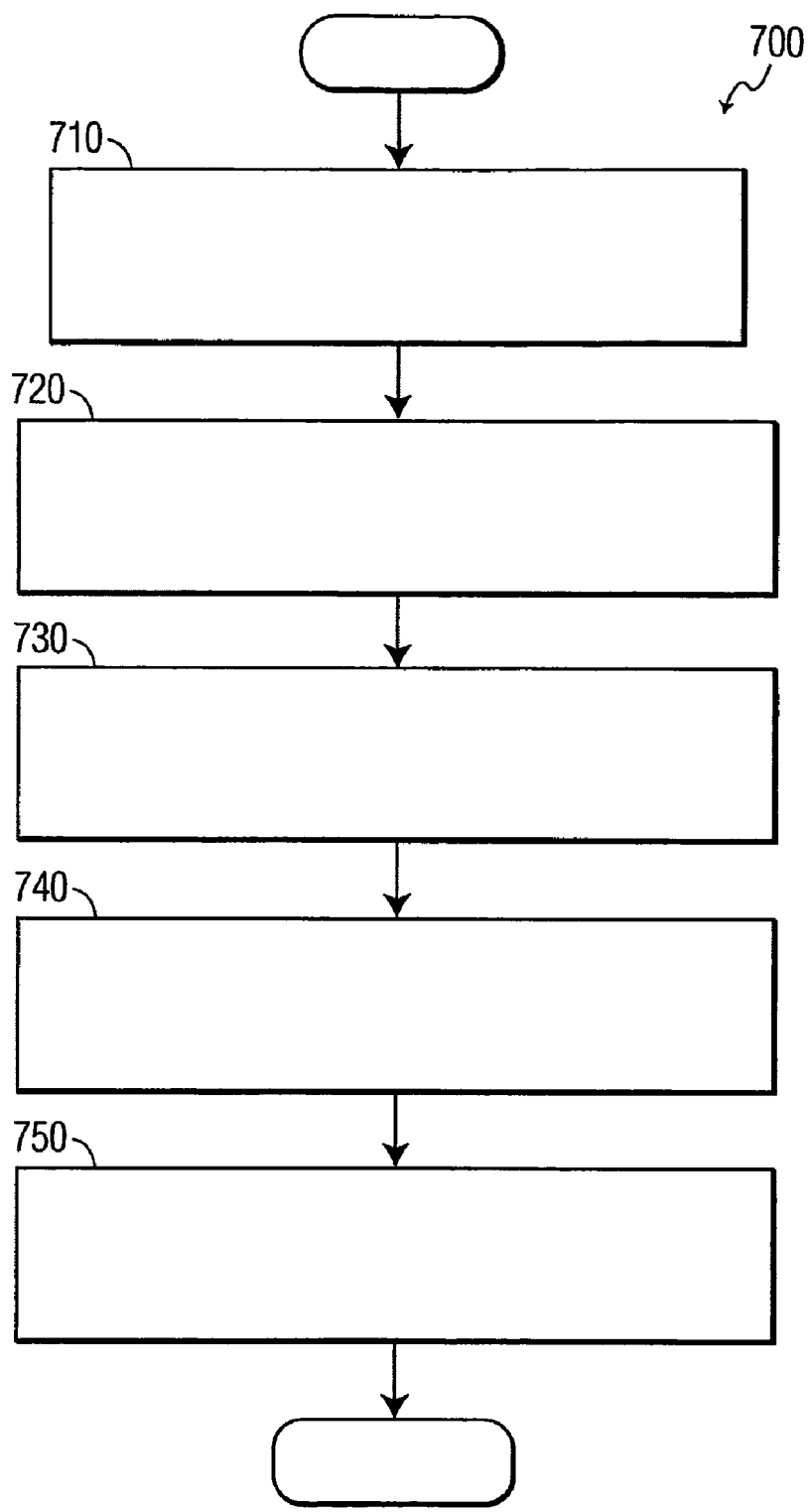
FIG. 7 illustrates a flowchart showing the steps of a second portion of an advantageous embodiment of the method of the invention.

FIG. 7 illustrates a flowchart showing the steps of a second portion of an advantageous embodiment of the method of the invention. The steps of the method shown in FIG. 7 are collectively referred to with reference numeral 700. In the first step shown in FIG. 7, content synthesis application processor 190 receives as input (1) a new audio signal to be analyzed, and (2) the speaking face movement components (SFMC) from step 640 and (3) the classified audio features from step 680 (step 710). Content synthesis application processor 190 then matches each speaking face component (SFMC) with each corresponding classified audio feature (step 720). Then content synthesis application processor 190 creates a computer generated animated face that represents the speaker for each selected audio-visual parameter (step 730).

Content synthesis application processor 190 synchronizes each computer generated animated face of the speaker with the speaker's speech (step 740). This creates an audio-visual representation of the speaker's face that is synchronized with the speaker's speech. The audio-visual representation of the speaker's face is then output to display unit 110 (step 750).

Figure 8:
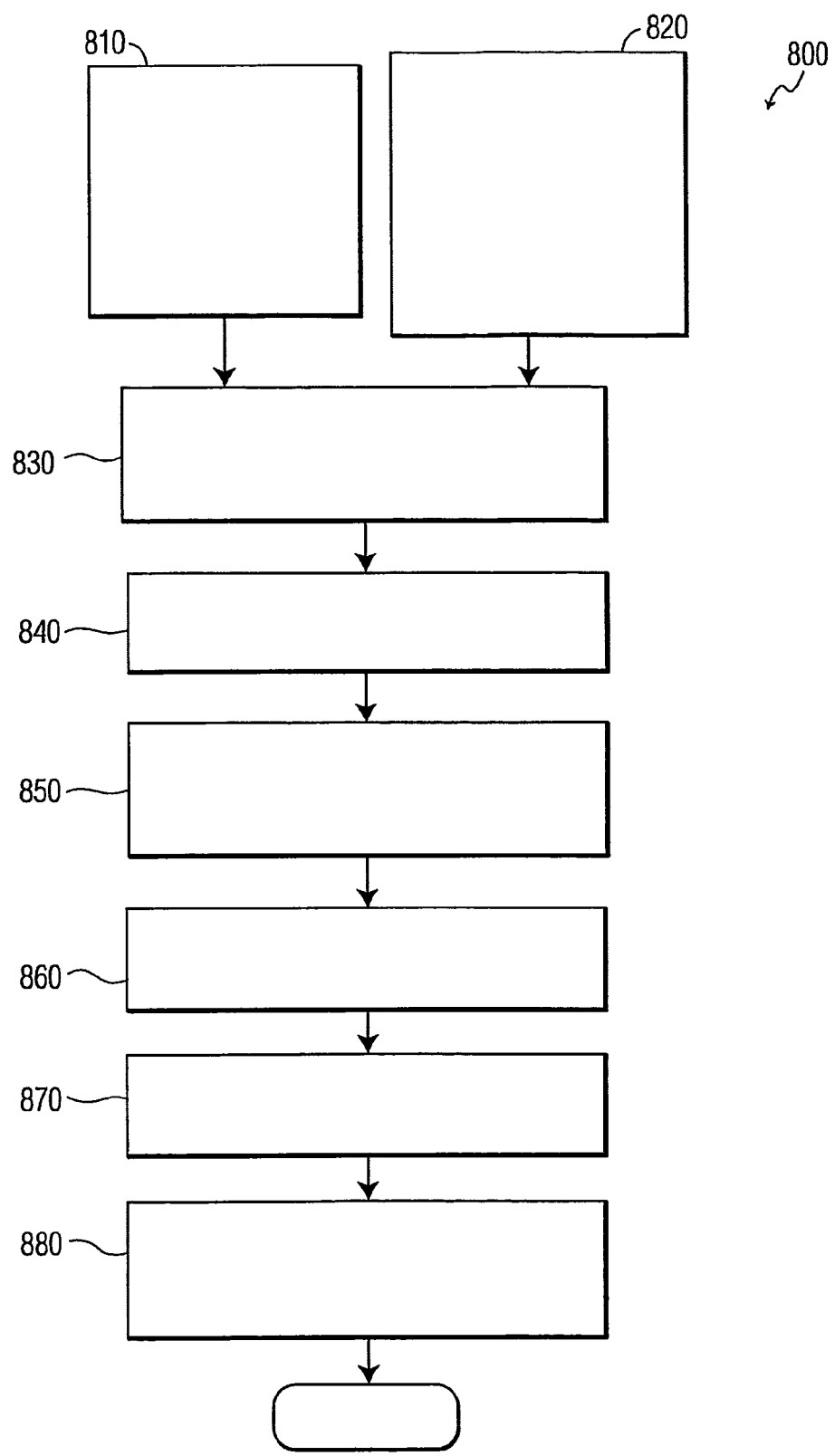
FIG. 8 illustrates a flowchart showing the steps of a third portion of an advantageous embodiment of the method of the invention.

FIG. 8 illustrates a flowchart showing the steps of a third portion of an advantageous embodiment of the method of the invention. The steps of the method shown in FIG. 8 are collectively referred to with reference numeral 800. Learning module 330 receives audiovisual input vectors and creates audiovisual speaking face movement components (SFMCs) using Hidden Markov Models (step 810). Learning module 330 receives audiovisual input vectors and creates audiovisual speaking face movement components (SFMCs) and uses semantic association to obtain an association (i.e., a mapping) between phonemes and visemes (step 820).

Content synthesis application processor 190 then receives a new audio signal to be analyzed and extracts the audio features of the speaker's speech using module 350 (step 830). Content synthesis application processor 190 then uses semantic association to find the video representations that correspond to the extracted audio features (step 840). Content synthesis application processor 190 then matches the audio representations with the audiovisual speaking face movement components (SFMCs) using Hidden Markov Models (step 850).

Then content synthesis application processor 190 creates a computer generated animated face that represents the speaker for each selected audiovisual speaking face movement components (SFMC) (step 860). Content synthesis application processor 190 synchronizes each computer generated animated face of the speaker with the speaker's speech (step 870). This creates an audio-visual representation of the speaker's face that is synchronized with the speaker's speech. The audio-visual representation of the speaker's face is then output to display unit 110 (step 880).

In the previously described steps 730, 740 and 750 and in the previously described steps 860, 870 and 880, a computer graphics approach was used to animate the faces. However, an alternative method may be used. In the alternative method stored video segments of the speaker are used in order to produce visual output that corresponds to the spoken phrase or sentence. After obtaining audiovisual segments using semantic association we obtain a sequence of video segments. Each of these segments corresponds to an individual phoneme. However, in the process of "stitching" time points the resulting video can exhibit a jerky pattern. These segments can be edited together into a single video that corresponds to the whole sentence or phrase. Video morphing and editing can be used to reduce the jerkiness between the individual video segments. The advantage to this approach is that there is no need to use 3D models and texture mapping that is the basis of the computer graphics approach.

The system and method of the present invention may be used, for example, in video conferencing, interactive video applications, and object level video editing. To present an animated face that correctly represents facial motions that correspond to spoken speech, a user only needs to transmit the text or the speech. The invention will generate an animated talking face to present the spoken version of the text by synthesizing visual speech elements at the receiving end of the transmission. The system and method of the invention transmits an audio signal across the transmission channel. The system and method of the invention also transmits a few parameters that tell the receiving end of the transmission how to drive the animated face to cause it to exhibit the correct visual features for the words that are spoken. The parameters are related to the audio-visual classification performed at the sender end.

Throughout this patent document the invention has been described as being capable of creating and using speaking face movement components (SFMC). It is understood that the invention is not limited to creating and using speaking face movement components (SFMC). The invention is capable of generating and using other types of audiovisual configurations as well. A speaking face movement component is only one particular embodiment of an audiovisual configuration that the invention is capable of creating and using.

While the present invention has been described in detail with respect to certain embodiments thereof, those skilled in the art should understand that they can make various changes, substitutions modifications, alterations, and adaptations in the present invention without departing from the concept and scope of the invention in its broadest form.

The invention claimed is:

1. An audio-visual content synthesis apparatus for (i) receiving audio-visual input signals that represent a speaker who is speaking and (ii) creating an animated version of the speaker's face that represent the speaker's speech, said apparatus comprising:
    means for extracting (i) audio features of the speaker's speech and (ii) visual features of the speaker's face from the audio-visual input signals;
    means for creating audiovisual input vectors from (i) the extracted audio features and (ii) the extracted visual features, wherein each audiovisual input vector comprises a hybrid logical unit that exhibits properties of both (a) the phonemes and (b) the visemes;
    means for creating audiovisual configurations from the audiovisual input vectors, wherein the audiovisual configurations comprise speaking face movement components in an audiovisual space; and
    means for performing a semantic association procedure on the audiovisual input vectors to obtain an association between phonemes that represent the speaker's speech and visemes that represent the speaker's face for each audiovisual input vector.

2. The apparatus as claimed in claim 1, further comprising:
    means for analyzing an input audio signal, wherein said input audio signal analyzing means is configured for:
    extracting audio features of a speaker's speech from the input audio signal;
    finding corresponding video representations for the extracted audio features using a semantic association procedure; and
    matching the corresponding video representations with the audiovisual configurations.

3. The apparatus as claimed in claim 2, wherein said analyzing matches the corresponding video representations with the audiovisual configurations using one of: a Hidden Markov Model and a Time Delayed Neural Network.

4. The apparatus as claimed in claim 2, wherein said semantic association procedure comprises one of: latent semantic indexing, canonical correlation, and cross modal factor analysis.

5. The apparatus as claimed in claim 2, further comprising:
    means for creating a computer generated animated face for each selected audiovisual configuration;
    means for synchronizing each computer generated animated face with the speaker's speech of the input audio signal; and
    means for outputting an audio-visual representation of the speaker's face synchronized with the speaker's speech.

6. The apparatus as claimed in claim 5, further comprising:
    means for implementing a facial audio visual feature matching and classification module that matches each of a plurality of audiovisual configurations with a corresponding classified audio feature to create a facial animation parameter; and
    means for implementing a facial animation for selected parameters module that creates an animated version of the face of the speaker for a selected facial animation parameter.

7. The apparatus as claimed in claim 6, wherein said facial animation for selected parameters module creates an animated version of the face of the speaker by using one of: (1) 3D models with texture mapping and (2) video editing.

8. The apparatus as claimed in claim 7, further comprising:
    means for implementing a speaking face animation and synchronization module that synchronizes each animated version of the face of the speaker with the audio features of the speaker's speech to create an audio-visual representation of the speaker's face that is synchronized with the speaker's speech; and
    means for implementing an audio expression classification module that determines a level of audio expression of the speaker's speech and provides said level of audio expression of the speaker's speech to said speaking face animation and synchronization module to use to modify animated facial parameters of the speaker in response to the determined level of audio expression.

9. The apparatus as claimed in claim 1, wherein the audio features extracted from the audio-visual input signals comprise one of: Mel Cepstral Frequency Coefficients, Linear Predictive Coding Coefficients, Delta Mel Cepstral Frequency Coefficients, Delta Linear Predictive Coding Coefficients, and Autocorrelation Mel Cepstral Frequency Coefficients.

10. The apparatus as claimed in claim 1, wherein said means for creating audiovisual configurations creates the audiovisual configurations from the audiovisual input vectors using one of: a Hidden Markov Model and a Time Delayed Neural Network.

11. A method for use in synthesizing audio-visual content in a video image processor, said method comprising the steps of:
    receiving audio-visual input signals that represent a speaker who is speaking;
    extracting (i) audio features of the speaker's speech and (ii) visual features of the speaker's face from the audio-input signals;
    creating audiovisual input vectors from (i) the extracted audio features and (ii) the extracted visual features, wherein each audiovisual input vector comprises a hybrid logical unit that exhibits properties of both (a) the phonemes and (b) the visemes;

creating audiovisual configurations from the audiovisual input vectors, wherein the audiovisual configurations comprise speaking face movement components in an audiovisual space; and performing a semantic association procedure on the audiovisual input vectors to obtain an association between phonemes that represent the speaker's speech and visemes that represent the speaker's face for each audiovisual input vector.

12. The method as claimed in claim 11, further comprising:

analyzing an input audio signal of a speaker's speech, wherein analyzing includes:

extracting audio features of the speaker's speech from the input audio signal;

finding corresponding video representations for the extracted audio features using a semantic association procedure; and matching the corresponding video representations with the audiovisual configurations.

13. The method as claimed in claim 12, further comprising the steps of:

creating a computer generated animated face for each selected audiovisual configuration;

synchronizing each computer generated animated face with the speaker's speech of the input audio signal; and outputting an audio-visual representation of the speaker's face synchronized with the speaker's speech.

14. The method as claimed in claim 12, wherein the corresponding video representations are matched with the audiovisual configurations using one of: a Hidden Markov Model and a Time Delayed Neural Network.

15. The method as claimed in claim 12, wherein said semantic association procedure comprises one of: latent semantic indexing, canonical correlation, and cross modal factor analysis.

16. The method as claimed in claim 11, wherein the audio features extracted from the audio-visual input signals comprise one of: Mel Cepstral Frequency Coefficients, Linear Predictive Coding Coefficients, Delta Mel Cepstral Frequency Coefficients, Delta Linear Predictive Coding Coefficients, and Autocorrelation Mel Cepstral Frequency Coefficients.

17. The method as claimed in claim 11, wherein the audiovisual configurations are created from the audiovisual input vectors using one of: a Hidden Markov Model and a Time Delayed Neural Network.

18. The method as claimed in claim 11, further comprising the steps of:

matching each of a plurality of audiovisual configurations with a corresponding classified audio feature to create a facial animation parameter; and creating an animated version of the face of the speaker for a selected facial animation parameter.

19. The method as claimed in 18, further comprising the step of:

creating an animated version of the face of the speaker by using one of: (1) 3D models with texture mapping and (2) video editing.

20. The method as claimed in claim 15, further comprising the steps of:

synchronizing each animated version of the face of the speaker with the audio features of the speaker's speech;

creating an audio-visual representation of the face of the speaker that is synchronized with the speaker's speech;

determining a level of audio expression of the speaker's speech; and modifying animated facial parameters of the speaker in response to a determination of the level of audio expression of the speaker's speech in response to the determined level of audio expression.

* * * * *